US012518475B2

(12) United States Patent
Goyal et al.

(10) Patent No.: US 12,518,475 B2
(45) Date of Patent: Jan. 6, 2026

(54) PROVIDING REALISTIC LIGHTING EFFECTS FROM A VIRTUAL BACKGROUND TO A DEPICTION OF A PARTICIPANT IN A VIDEO CALL

(71) Applicant: Adobe Inc., San Jose, CA (US)

(72) Inventors: Ketan Goyal, Uttar Pradesh (IN); Manish Chhabra, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 182 days.

(21) Appl. No.: 18/373,601

(22) Filed: Sep. 27, 2023

(65) Prior Publication Data

US 2025/0104337 A1   Mar. 27, 2025

(51) Int. Cl.
*G06T 15/50*   (2011.01)
*G06T 15/04*   (2011.01)
*G06T 15/60*   (2006.01)
*G06T 19/00*   (2011.01)

(52) U.S. Cl.
CPC ............ *G06T 15/506* (2013.01); *G06T 15/04* (2013.01); *G06T 15/60* (2013.01); *G06T 19/006* (2013.01); *G06T 2200/24* (2013.01); *G06T 2219/024* (2013.01)

(58) Field of Classification Search
CPC ....... G06T 15/506; G06T 15/04; G06T 15/60; G06T 19/006; G06T 2200/24; G06T 2219/024
See application file for complete search history.

(56) References Cited

U.S. PATENT DOCUMENTS

| 10,628,019 B2 | 4/2020 | Parmar et al. |
| 2019/0355172 A1 | 11/2019 | Dsouza et al. |
| 2025/0095283 A1* | 3/2025 | Pinhasov ............... H04N 5/265 |

OTHER PUBLICATIONS

Rhee et al., MR360: Mixed Reality Rendering for 360° Panoramic Videos, IEEE Transactions on Visualization and Computer Graphics, vol. 23, No. 4, Apr. 2017, pp. 1302-1311. (Year: 2017).*

(Continued)

*Primary Examiner* — Haixia Du
(74) *Attorney, Agent, or Firm* — Kilpatrick Townsend & Stockton LLP

(57) ABSTRACT

A system applies an object detection model to a mapped graphical spherical object including a 360 degree virtual background image mapped to a spherical graphical model to identify a light source within the mapped graphical spherical object. The system generates a light source mapped graphical spherical object by replacing, in the mapped graphical spherical object, the light source with a light source object associated with one or more light properties. The system extracts, during a video call, a human body object from a live video feed captured via a user computing device. The system generates, based on the light source mapped graphical spherical object and the human body object, a finalized spherical live image including applying one or more lighting and/or shadow effects caused by the light source object within the light source mapped graphical spherical object. The system generates, from the finalized spherical image, a finalized rectangular live image.

20 Claims, 7 Drawing Sheets

(56) References Cited

OTHER PUBLICATIONS

Song et al., Real-time Shadow-aware Portrait Relighting in Virtual Backgrounds for Realistic Telepresence, 2022 IEEE International Symposium on Mixed and Augmented Reality (ISMAR), pp. 729-738 (Year: 2022).*

Yang, Hanton, "How to Create a 360 Video Player with OpenGL ES 3.0 and GLKit in IOS", Available at https://medium.com/@hanton.yang/how-to-create-a-360-video-player-with-opengl-es-3-0-and-glkit-360-3f29a9cfac88, Feb. 28, 2018, 19 pages.

Elektrobild, "Your Photo as Texture of a 3D Sphere", Available at https://elektrobild.org/photo-filter/3d-sphere, 2023, 2 pages.

Photo Sphere Viewer, "Playground", Available at https://photo-sphere-viewer.js.org/playground.html, 2023, 1 page.

* cited by examiner

Finalized spherical live scene 104

Finalized rectangular live scene 105

User interface 701

Finalized rectangular live scene 105-1

Finalized rectangular live scene 105-2

360 degree background image 101

Finalized rectangular live image 105

360 degree background image 101

Finalized rectangular live image 105-1

Finalized rectangular live image 105-2

Finalized rectangular live image 105-3

PROVIDING REALISTIC LIGHTING EFFECTS FROM A VIRTUAL BACKGROUND TO A DEPICTION OF A PARTICIPANT IN A VIDEO CALL

TECHNICAL FIELD

This disclosure generally relates to techniques for facilitating a virtual background in a video call. More specifically, but not by way of limitation, this disclosure relates to providing realistic appearances of a virtual background of a video call and of a video call participant depicted within the virtual background of the video call.

BACKGROUND

Video calling has become a common method of both personal and official communication. In some instances, a participant in a video call wishes to display himself or herself within a virtual background. For example, a video call participant is working from home and wishes to display himself within an office virtual background or a beach setting instead of within the participant's actual background at his home.

SUMMARY

The present disclosure describes techniques for generating a video call scene including lighting effects from light sources of a 360 degree virtual background on the virtual background of the video call scene and on a video call participant depicted in the video call scene. A scene generation system receives, during a video call between a first user computing device and a second user computing device and via an input to a first user interface of the first user computing device, a selection of a 360 degree virtual background from a set of virtual backgrounds. The scene generation system applies an object detection model to a mapped graphical spherical object including the 360 degree virtual background image mapped to a graphical spherical object to identify a light source region defining a light source within the mapped graphical spherical object. The scene generation system replaces, in the mapped graphical spherical object, the light source region with alight source object associated with one or more light properties. The scene generation system extracts, during the video call, a human body object from a live video feed captured via the first user computing device. The scene generation system generates, based on the mapped graphical spherical object and the human body image, a finalized spherical live image. Generating the finalized spherical live image includes projecting the extracted human body image onto a surface of the finalized spherical live image and editing the extracted human body object by applying one or more lighting effects to the extracted human body image caused by the light source object within the mapped graphical spherical object. The scene generation system generates, from the finalized spherical image, a finalized rectangular live image.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
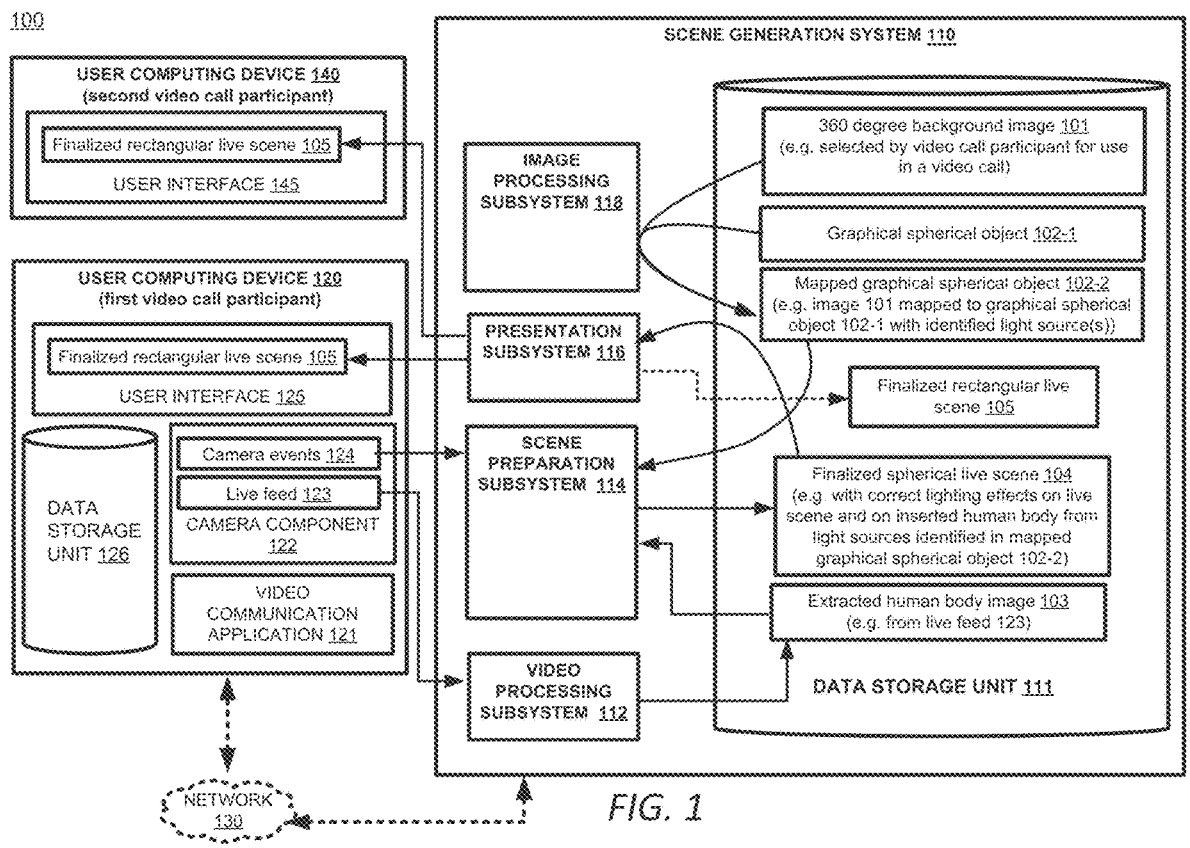
FIG. 1 depicts an example of a computing environment for generating a video call scene including lighting effects from light sources of a virtual background on a video call participant depicted in the virtual background and on the virtual background of the video call scene, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Conventional scene generation systems can output a video call scene depicting a video call participant within a virtual background. However, such conventionally generated video call. scenes merely preserve lighting and shadow effects on an appearance of the video call participant from lighting in the video call participant's actual background. These lighting and shadow effects on the participant's appearance in conventional video call scenes may not provide a realistic appearance of the participant with respect to the virtual background in which the participant is depicted. For example, in the virtual call participant's actual background, a lamp is shining on left side of the participant's body but, in the virtual background, a lighting source is located to the right of the user. In this example, the lighting on the right side of the participant's body which is captured by the participant's camera feed will not appear realistic in view of the participant's location within the virtual background of the conventionally generated video call scene.

Certain embodiments described herein address the limitations of conventional scene generating systems by providing lighting effects and/or shadow effects on virtual background and on a participant depicted in the virtual background from light sources identified in the virtual background of a virtual call scene. The scene generation system described herein identifies light sources in a virtual background and then modifies a lighting on the participant's body as depicted in the video call based on an orientation and position of the body with respect to the identified lighting sources in the virtual background and modifies a lighting on the virtual background itself. Modifying the lighting can include applying lighting and/or shadow effects. The video call scenes generated using the methods described herein, which include lighting effects on the virtual background and on the participant's body within the video call scene from lighting sources within the virtual background, are superior over conventionally generated video scenes which merely insert an image/video of the participant's body with lighting effects on the participant from the participant's real environment as captured in the participant's camera feed and do not represent effects of lighting sources on the depicted participant's body and virtual background or effects to the virtual background caused by interaction with the depicted participant's body and light emitted from a virtual background light source.

The following non-limiting example is provided to introduce certain embodiments. In this example, a scene generation system identifies lighting sources in a 360 degree virtual background image. For example, the user initiates a virtual call and instead of showing himself within his real background (e.g. within a kitchen from where he is conducting the video call) the user selects a virtual office background and requests to replace the real background with the virtual office background. A 360 degree virtual background image selected by the user for the virtual office background is of an office environment (e.g. with a desk, chairs, furniture, etc.). The user may select the virtual background via the user interface. The 360 degree virtual background image can be mapped or otherwise modeled on an inner surface of a graphical spherical object. For example, the scene generation system can convert a 360-degree background image of an office environment to a mapped graphical spherical object by mapping the 360 degree background image to the graphical spherical object and can apply a light source detection model to the mapped graphical spherical object to identify light sources in the mapped graphical spherical object. Converting the 360-degree background image to a mapped graphical spherical object can include applying the 360-degree background image to an inner surface of a spherical object. For example, the graphical spherical object is a spherical object of a graphics system (e.g. a sphere object of a 3D graphics system such as an OpenGL spherical model). The mapped graphical spherical object comprises the graphical spherical object on which the 360-degree background image is mapped. Identifying the light source can further include determining properties associated with the light source. Properties can include a color, a direction, an intensity of emitted light, or other properties. For example, an example white light-emitting diode (LED) light source in the office virtual background emits a "milky" color light in all directions. In some instances, for each light source identified in the mapped graphical spherical object, the scene generation system creates a light source object with similar properties to the identified light source and attaches the light source object to the mapped graphical spherical object at the position of the identified light source. The light source object, in some instances, is a light source object of a 3D graphics system, for example, an OpenGL based light source object.

The scene generation system extracts, during a video call, a human body image of a video call participant from a live camera feed. Continuing with the previous example, the user is conducting a live video call from his kitchen but requests to change the real (kitchen) background to the virtual office background. For example, responsive to receiving a selection of a user interface object to initiate the video call and a selection of the virtual office background, a live feed of the user's computing device can capture video of an environment of the user including the user's body. For example, the live feed is a live video feed including video of the user's body as well as any other objects in the environment captured by the camera component (e.g. objects in the user's kitchen from where is physically present when conducting the video call. The scene generation system can use one or more object detection models to differentiate a human body image within a video frame from a background area within the video frame and replace background pixels with transparent pixel values and generate an extracted human body image that includes pixels in the video frame associated only with the human body and no background pixels.

The scene generation system prepares a finalized spherical scene using the extracted human body image of the video call participant and the mapped graphical spherical object. Preparing the finalized spherical scene includes applying lighting effects to a human body object comprising the human body image inserted within the background scene of the mapped graphical spherical object and lighting/shadow effects to the background scene based on a position of the human body object with respect to the identified lighting sources within the mapped graphical spherical object. For example, a lighting effect represents contact of light emitted from the light source with the depicted human body object and/or with the virtual background. For example, a shadow effect represents shadows caused by blockage by the depicted human body object and/or other objects within the virtual background of the light emitted from the light source. The scene generation system can place the extracted human body object within the mapped graphical spherical object based on the camera angle and position determined from camera events data of the user computing device. The scene generation system determines lighting effects and shadow effects on the extracted human body object and on the background scene based on the light sources identified in the mapped graphical spherical object and applies these lighting effects and/or shadow effects to the extracted human body object and/or to the background scene within the mapped graphical spherical object to generate the finalized spherical live scene. For example, the extracted human body object is positioned to a left of a virtual lamp object within the mapped graphical spherical object and therefore the scene generation system applies a lighting effect to a right side of the extracted human body object and applies a shadow effect to a region of the background scene to represent a shadow effect of the human body object with respect to the background scene to generate a finalized spherical live image. The scene generation system can determine the lighting effects and/or the shadow effects based on various properties of the light sources identified within the mapped graphical spherical object including position, angle, color of light, brightness of light, intensity of light, and other properties. Applying the lighting effects and/or the shadow effects can include modifying one or more pixel values (e.g. red-green-blue color values, transparency values, etc.) of the pixels of the extracted human body object portion of the mapped graphical spherical object and/or modifying one or more pixel values of the pixels of the background scene portion of the mapped graphical spherical object to generate the finalized spherical live scene.

The scene generation system prepares a two-dimensional (2D) output image for the video call based on the finalized spherical live scene. In some instances, the scene generation system captures a finalized rectangular live scene using a virtual camera positioned within the finalized spherical live scene. The finalized rectangular live scene is an image captured of the finalized spherical live scene generated from the mapped graphical spherical object that includes the extracted human body object located within the finalized mapped graphical spherical object with lighting and/or shadow effects that were applied to the extracted human body object and/or background scene in the finalized mapped graphical spherical object.

The scene generation system displays, via the user interface during the video call, the 2D output image. In some instances, the finalized rectangular live scene depicting the user within a virtual background (e.g. the virtual office environment) is displayed via the user interface of the user computing device associated with the user. In some instances, displaying the 2D output image (the finalized rectangular live image) can include displaying it during the video call via a second user computing device different from the first user computing device. For example, the user is a first video call participant using a first user computing device to participate in a video call with a second video call participant who is using a second user computing device. In this example, the finalized rectangular live scene depicting the first video call participant within a virtual background is displayed via the user interface of a user computing device associated with a second video call participant.

The embodiments described herein, specifically generating the video call scene described herein, significantly improves an appearance of a an overall scene including an appearance of a background scene and an appearance of human body of a video call participant depicted within the background scene of the virtual call. As previously discussed, conventionally generated video call scenes merely preserve lighting and shadow effects on an appearance of the video call participant from lighting in the video call participant's actual background. These lighting and shadow effects on the participant's appearance in conventional video call scenes may not provide a realistic appearance of the participant with respect to the virtual background and/or a realistic appearance of the virtual background itself in which the participant is depicted. The embodiments described herein address these deficiencies of the conventional scene generation methods by incorporating lighting and/or shadow effects on a human body object (an extracted human body image of a video call participant) depicted within a virtual background and/or incorporating lighting and/or shadow effects on the virtual background from lighting sources identified within the virtual background.

Example Operating Environment for Generating a Video Call Scene Including Lighting Effects from Light Sources of a Virtual Background on a Video Call Participant Depicted in the Virtual Background and on the Virtual Background of the Video Call Scene Referring now to the drawings, FIG. 1 depicts an example of a computing environment 100 for generating a video call scene including lighting effects from light sources of a virtual background on a video call participant depicted in the virtual background and on the virtual background of the video call scene, according to certain embodiments disclosed herein. Lighting effects can include lighting effects and/or shadow effects. The computing environment 100 includes, as depicted in FIG. 1, a scene generation system 110, which can include one or more processing devices that executes a video processing subsystem 112, a scene preparation subsystem 114, a presentation subsystem 116, and an image processing subsystem 118. In certain embodiments, the scene generation system 110, including the video processing subsystem 112, the scene preparation subsystem 114, the presentation subsystem 116, the image processing subsystem 118, and the data storage unit 111, is a component of a user computing device 120 and operates on the user computing device 120. In certain embodiments, as also depicted in FIG. 1, the scene generation system 110, including the video processing system 112, the scene preparation subsystem 114, the presentation subsystem 116, the image processing subsystem 118, and the data storage unit 111, is a network server or other computing device that is accessible to the user computing device 120 and communicates with the user computing device 120 via a network 130.

The scene generation system 110 receives a live feed 123 from a camera component 122 of a user computing device 120 of a participant of a video call and generates a finalized rectangular live scene 105 depicting the participant within a virtual background. The image processing subsystem 118 of the scene generation system 110 generates a mapped graphical spherical object 102-2 for the video call from a 360 degree background image 101 selected by the video call participant. For example, the image processing system 118 maps the 360 degree background image 101 to a graphical spherical object 102-1 to generate the mapped graphical spherical object 102-2. The video processing subsystem 112 of the scene generation system 110 live feed 123 data from a camera component 122 of the user computing device 120 and extracts an extracted human body image 103 of the video call participant from the live feed 123 data.

The scene preparation subsystem 114 of the scene generation system 110 generates, based on the mapped graphical spherical object 102-2 and the extracted human body image 103, a finalized spherical live scene 104. To generate the finalized spherical live scene, the image processing subsystem 118 identifies light sources within the mapped graphical spherical object 102-2. The scene preparation subsystem 114 applies lighting and shadow effects to the extracted human body image 103 (which is a human body object placed within the mapped graphical spherical object 102-2) and shadow effect to the virtual background image based on a position of the extracted human body image 103 with respect to the identified light sources in the mapped graphical spherical object 102-2. Light sources within the mapped graphical spherical object 102-2 may include a natural lighting source (e.g. sun, moon, stars, a fire) or an artificial lighting source (e.g. a lamp or other artificial light source).

The presentation subsystem 116 of the scene generation system 110 generates, based on the finalized spherical live scene 104, a finalized rectangular live scene 105. The finalized rectangular live scene 105, in some instances, is displayed in the user interface 125 of a first participant in the video call from which camera component 122 data is received. The finalized rectangular live scene 105, in some instances, is displayed via user interface 145 of a user computing device 140 of a second participant in the video call.

The scene generation system 110 includes a data storage unit 111. An example data storage unit 111 is accessible to the scene generation system 110 and stores data for the scene generation system 110. In some instances, the data storage unit 111 stores a 360 degree background image 101 for use as a virtual background in a video call. The data storage unit 111 stores a mapped graphical spherical object 102-2 generated by mapping a 360 degree background image onto a graphical spherical object 102-1. In certain embodiments, the data storage unit 111 stores the mapped graphical spherical object 102-2 along with an annotation of light sources identified in the mapped graphical spherical model 102-2 by the image processing subsystem 118. In some instances, the data storage unit 111 stores an extracted human body image 103 extracted from a live feed 123 of a camera component 122 of a user computing device 120. In some instances, the data storage unit 111 stores a finalized spherical live scene 104 generated by the scene preparation subsystem 114 based on the extracted human body image 103, the mapped graphical spherical object 102-2, and camera events 124 data received from the camera component 122. In some instances, the data storage unit 111 stores a finalized rectangular live scene 105 for the video call that is generated by the presentation subsystem 116 based on the finalized spherical live scene 104.

An example user computing device 120 includes a video communication application 121, a camera component 122, a user interface 125, and a data storage unit 126. In some examples, the user computing device 120 is associated with a first participant in a video call. In certain embodiments, the user computing device 120 is a smart phone device, a personal computer (PC), a tablet device, or other user computing device 120. In some embodiments, the user computing device 120, as depicted in FIG. 1, includes the scene generation system 110. For example, the video processing subsystem 112, the scene preparation subsystem 114, the presentation subsystem 116, and the image processing subsystem 118 are components of the video communication application 121 and the data storage unit 126 performs functions described herein as being performed by the data storage unit 111. However, in other embodiments, as also depicted in FIG. 1, the user computing device 120 is a separate system from the scene generation system 110 and communicates with the scene generation system 110 via the network 130.

The video communication application 121, in some embodiments, is associated with a scene generation service and the user downloads the video communication application 121 on the user computing device 120. For example, the user accesses an application store or a website of an scene generation service using the user computing device 120 and requests to download the video communication application 121 on the user computing device 120. The video communication application 121 operates on the user computing device 120 and enables a user of the user computing device 120 to participate in a video call and have his or her body image depicted in a virtual background in a virtual call scene generated for the video call. The video communication application 121 enables the user to interact, via the user interface 125 with the video communication application 121. The video communication application 121 can communicate with the user interface 125 to receive one or more inputs from the user, for example, a selection of a 360 degree background image 101 for use in a video call, a request to initiate a video call, a request to change the selection of the 360 degree background image 101 used in the video call, a request to terminate the video call, or other input of the user. The video communication application 121 can instruct the user interface 125 to display a finalized rectangular live scene 105 generated based on an extracted human body image 103 extracted from a live feed 123 of a camera component 122 of the user computing device 120, camera events 124 data from the camera component 122, and a mapped graphical spherical object 102-2 generated from mapping the 360 degree background image 101 selected for use by the user as the virtual background of the video call to a graphical spherical object 102-1. In some embodiments, the video communication application 121 communicates with one or more of the video processing subsystem 112, the scene preparation subsystem 114, the presentation subsystem 116, or the image processing subsystem 118.

In certain embodiments, the video communication application 121 includes the video processing subsystem 112, the scene preparation subsystem 114, the presentation subsystem 116, and the image processing subsystem 118 and performs the operations described herein as being performed by the subsystems 112, 114, 116, and 118. For example, in certain embodiments, the video communication application 121 of the user computing device 120 can generate a finalized rectangular live scene 105 for a video call based on data from a camera component 122 of the user computing device 120 and based on a 360 degree background image 101 selected by the user as a virtual background for the video call.

In certain embodiments the camera component 122 is a camera module or camera device component of the user computing device 120 that is able to capture images and/or video of an environment of the camera component 122. In some embodiments, the camera component 122 is a separate device from the user computing device 120 and is communicatively coupled to the user computing device 120. The camera component 122 communicates with the video communication application 121 and transmits, to the video communication application 121, live feed 123 data (e.g. a video feed) and camera events 124 data captured by the camera component 122. For example, the live feed 123 data is of an environment of the user computing device camera component 122. For example, the live feed 123 data captures live video of the user of the user computing device 120, who is a first participant in a video call. Camera events 124 data can include a change in one or more of an angle, a position, a magnification factor, or other change in the camera component 122 during the video call.

The data storage unit 126 is accessible to the user computing device 120 and stores data for the user computing device 120. In some instances, the data storage unit 126 stores one or more of the extracted human body image 103 extracted by the video processing subsystem 112, the 360 degree background image 101 used to generate the mapped graphical spherical object 102-2, the mapped graphical spherical object 102-2, the finalized spherical live scene 104, or the finalized rectangular live scene 105.

The user interface 125 can include a touchscreen display interface, a display device (e.g., a monitor) with a separate input device (e.g., a mouse), or other user interface 125 which can receive one or more inputs from the user and display information or provide other output to the user. For example, the user interface 125 can display a finalized rectangular live scene 105 generated by the scene generation system 110 using camera component 122 data (e.g. a live feed 123) of the user computing device 120 and a 360 degree background image 101 selected by the user. In some instances, the user interface 125 displays one or more user interface objects for selecting a 360 degree background image 101 for a video call from a set of stored 360 degree background images 101. The user interface 125 can display one or more user interface objects for initiating a video call, terminating the video call, activating the camera component 122, deactivating the camera component 122, changing the selection of the 360 degree background image 101 to another 360 degree background image 101.

As depicted in FIG. 1, the scene generation system 110 can also provide, for display on a user interface 145 of a user computing device 140, the finalized rectangular live scene 105 generated by the scene generation system 110. For example, the user computing device 120 is associated with a first participant in a video call and the user computing device 140 is associated with a second participant in the video call. In this example, the finalized rectangular live scene 105 depicts the first participant in a virtual background and can be displayed on one or more of the user interface 125 of the user computing device 120 or the user interface 145 of the user computing device 140. For example, the first participant in the video call views, during the video call, himself depicted in the finalized rectangular live scene 105 in a region of the user interface 125 and views the second participant of the video call in another region of the user interface 125. In this example, For example, the second participant in the video call views, during the video call, the first participant depicted in the finalized rectangular live scene 105 in a region of the user interface 125 and views himself depicted in another region of the user interface 125.

The scene generation system 110, including the video processing subsystem 112, the scene preparation subsystem 114, the presentation subsystem 116, and the image processing subsystem 118, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of ordinary skill in the art would recognize many possible variations, alternatives, and modifications. For example, in some implementations, the scene generation system 110 can be implemented using more or fewer systems or subsystems than those shown in FIG. 1, may combine two or more subsystems, or may have a different configuration or arrangement of the systems or subsystems.

Figure 2:
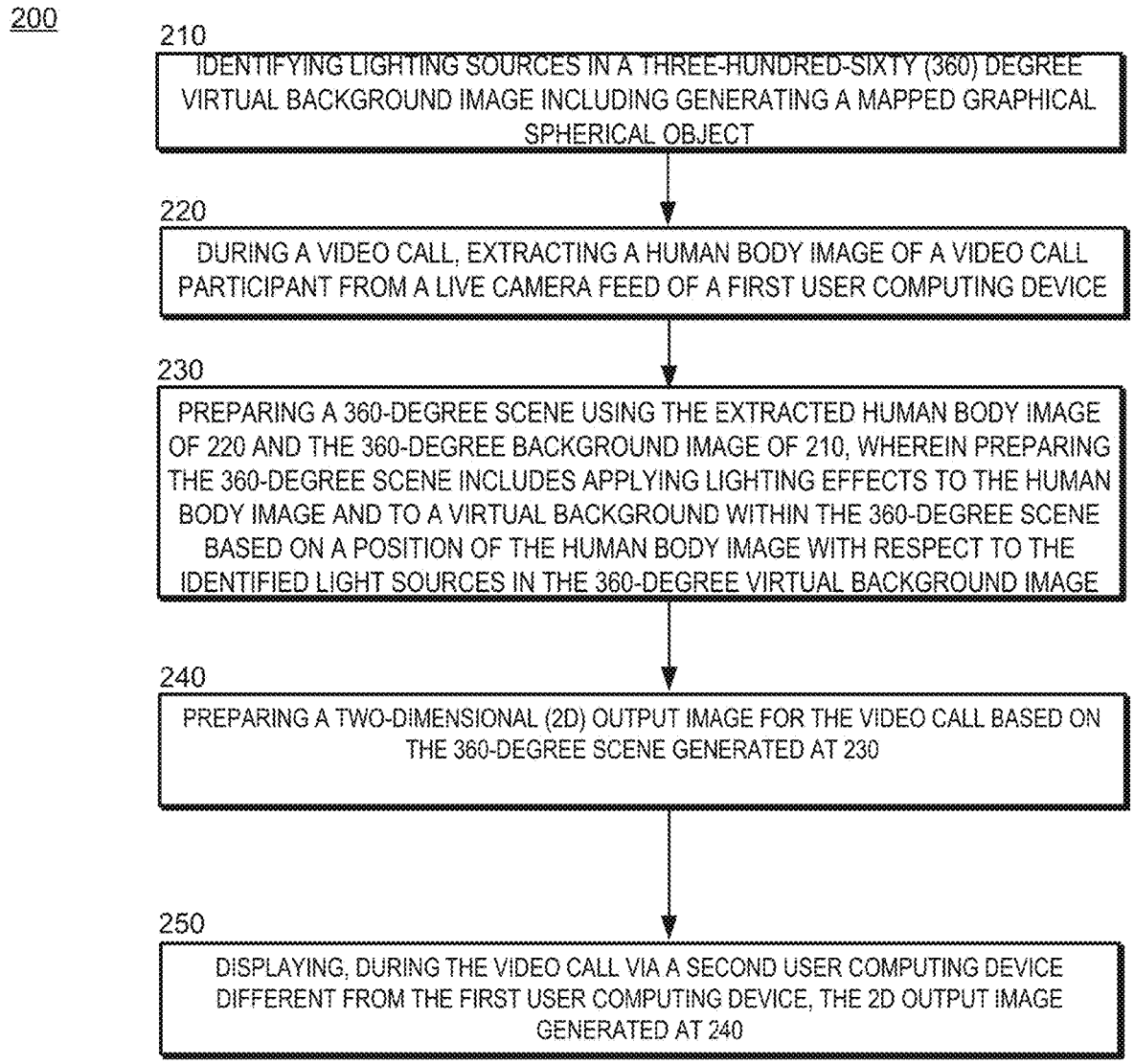
FIG. 2 depicts a method to generate a video call scene including lighting effects from light sources of a virtual background on a video call participant depicted in the virtual background and on the virtual background of the video call scene, according to certain embodiments disclosed herein.

Examples of Computer-Implemented Operations for Generating a Video Call Scene Including Lighting Effects from Light Sources of a Virtual Background Applied on a Video Call Participant Depicted in the Virtual Background and on the Virtual Background of the Video Call Scene In the embodiments described herein, the scene generation system 110 can generate, for a video call, a finalized rectangular live scene 105 depicting a participant of the video call with lighting effects applied to the depiction of the participant within the virtual background and/or lighting effects applied to the virtual background from lighting sources identified in the virtual background. The lighting effects can include lighting effects and/or shadow effects. The scene generation system 110 can generate the finalized rectangular live scene 105 based on live feed 123 data from a camera component 122 of a user computing device 120 of the video call participant, camera events 124 data received from the camera component 122, and a 360 degree background image 101 of the virtual background. FIG. 2 provides further details about generating the finalized rectangular live scene 105 including lighting effects from light sources of a virtual background on the video call participant depicted in the virtual background and on the virtual background in the finalized rectangular live scene 105.

FIG. 2 depicts a method to generate a video call scene including lighting effects from light sources of a virtual background on a video call participant depicted in the virtual background and on the virtual background in the video call scene, according to certain embodiments disclosed herein. One or more computing devices (e.g., scene generation system 110 or the subsystems 112, 114, 116, and 118 thereof) implement operations depicted in FIG. 2. For illustrative purposes, the method 200 is described with reference to certain examples depicted in the figures. Other implementations, however, are possible.

In certain embodiments described herein, the scene generation system 110 is a component of the user computing device 120 and the operations described herein as performed by the scene generation system 110 (or one or more of the subsystems 112, 114, 116, or 118 thereof) are performed by the video communication application 121 of the user computing device 120. However, in some embodiments, the scene generation system 110 is separate from the user computing device 120 and communicates with the user computing device 120 via the network 130. In some embodiments, the scene generation system 110 is separate from the user computing device 120 but one or more operations described herein as performed by the scene generation system 110 (or one or more subsystems 112, 114, 116, or 118 thereof) are performed by the video communication application 121 of the user computing device 120.

Figure 3:
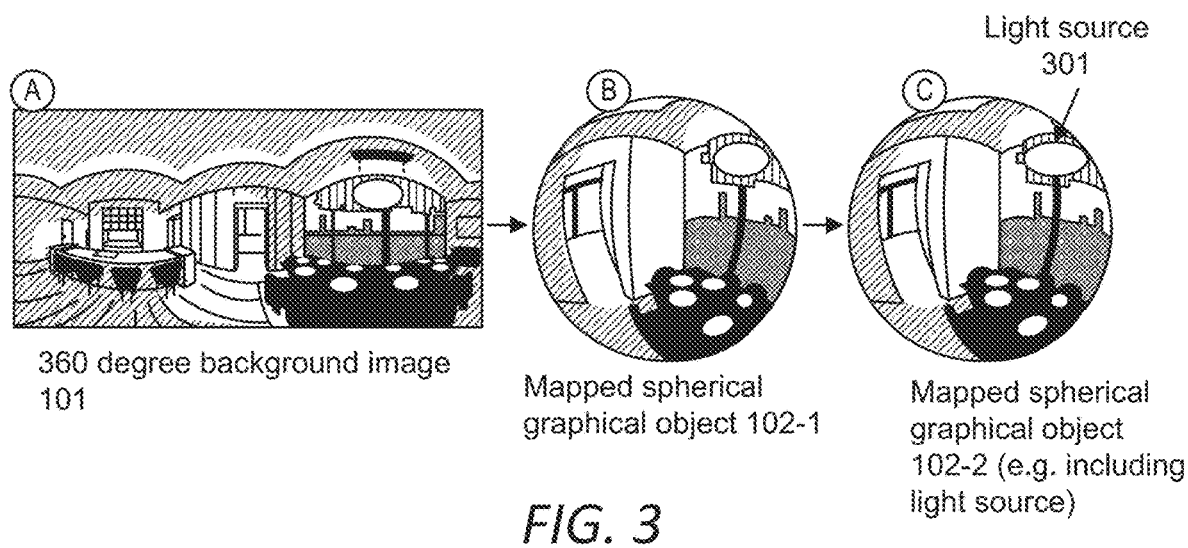
FIG. 3 depicts an illustration of a conversion of a 360 degree background image to a mapped graphical spherical object including identifying light sources, according to certain embodiments disclosed herein.

At block 210, the method 200 involves identifying light sources in a three-hundred-sixty (360) degree virtual background image including generating a mapped graphical spherical object 102-2. In certain examples, a user of the user computing device 110 accesses the video communication application 121 and requests to initiate a video call by selecting one or more objects on the user interface 125. In certain embodiments, the user selects, from among a set of 360 degree background images 101, a 360 degree background image 101 for use in the in the requested video call and the image processing subsystem 118 converts the selected 360 degree background image 101 to a mapped graphical spherical object 102-2. For example, the user is a participant in the video call and wants to be depicted within a virtual environment represented by the selected 360 degree background image 101. The selected 360 degree background image 101 may be of an office environment, a natural environment (e.g. a mountain environment, a beach environment, or other environment), an indoor environment, a tourist location environment, or other virtual background environment. The 360 degree background image 101 is, in some instance, a 360-degree background image. The user may select the selected 360 degree background image 101 via the user interface 125. For example, the user interface 125 displays a user interface 125 object associated with each selectable 360 degree background image 101 and receives a selection of the user interface object 125 associated with the selected 360 degree background image 101. In certain embodiments, the image processing subsystem 118 maps the 360 degree background image 101 to a graphical spherical object 102-1 to generate the mapped graphical spherical object 102-2. For example, the graphical spherical object 102-1 is an inner surface of a hollow sphere from Open Graphics Library (OpenGL). The image processing subsystem 118 applies a light source detection model to the mapped graphical spherical object 102-2 to identify light sources in the mapped graphical spherical object 102-2. Identifying the light source can further include determining properties associated with the light source. Properties can include a color, a direction, an intensity of emitted light, or other properties. For example, an example white light-emitting diode (LED) light source emits a "milky" color light in all directions, and an example sodium lamp installed on a road side pole emits a yellow light focused in a particular direction. In some instances, for each light source identified in the mapped graphical spherical object 102-2, the image processing subsystem 118 creates a light source model with similar properties to the identified light source and attaches the light source model to the mapped graphical spherical object 102-2 at the position of the identified light source. The light source model, in some instances, is an OpenGL based light source model. FIG. 3 depicts an illustration of a conversion of a 360 degree background image 101 to a mapped graphical spherical object 102-2 including identified light sources.

In another embodiment, instead of converting a selected 360 degree background image 101, the user selects a mapped graphical spherical object 102-2 for use as a virtual background for the video call. Each of the selectable mapped graphical spherical objects 102-2, including the selected mapped graphical spherical object 102-2, includes identified light sources in the mapped graphical spherical object 102-2 with light source models attached to the mapped graphical spherical object 102-2 at corresponding locations within the mapped graphical spherical object 102-2. In some instances, the scene generation system 110 displays, via the user interface 125, a user interface 125 object associated with each selectable mapped graphical spherical object 102-2 and receives a selection of the user interface object 125 associated with the selected mapped graphical spherical object 102-2.

Figure 4:
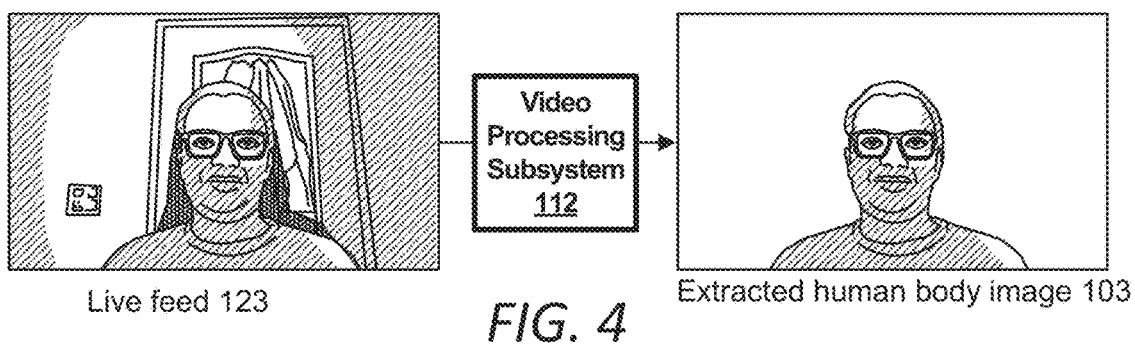
FIG. 4 depicts an illustration of an extraction of an extracted human body image from a live feed received from a camera component of a user computing device, according to certain embodiments disclosed herein.

At block 220, the method 200 involves extracting, during a video call, a human body image of a video call participant from a live camera feed of a first user computing device. For example, responsive to receiving a selection of a user interface 125 object to initiate the video call, the video communication application 121 activates the camera component 122 of the user computing device 120 to capture a live feed 123 of an environment of the user computing device 120. For example, the live feed 123 is a live video feed including video of the user's body as well as any other objects in the environment captured by the camera component 122. In a certain embodiment, the video processing system 112 uses one or more object detection models to differentiate a human body image within a video frame from a background area within the video frame and replace background pixels with transparent pixel values. The video processing system 112 generates an extracted human body image 103 that includes pixels in the video frame associated only with the human body and no background pixels. FIG. 4 depicts an illustration of an extraction of an extracted human body image 103 from a live feed 123 received from a camera component 122 of a user computing device 120.

Figure 5:
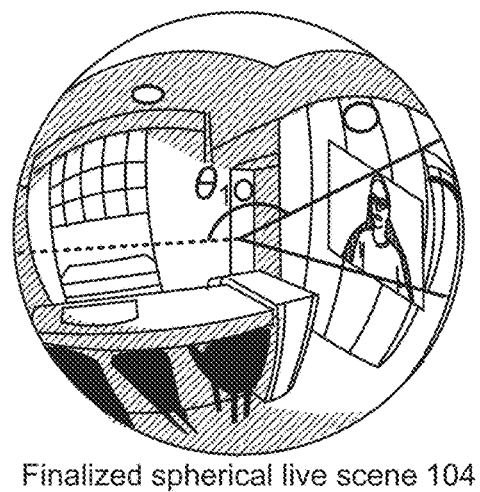
FIG. 5 depicts an illustration of inserting the extracted human body image of FIG. 4 in the mapped graphical spherical object of FIG. 3 and applying lighting effects to the extracted human body image and to a virtual background region of the mapped graphical spherical object based on light sources identified in the mapped graphical spherical object to generate a finalized spherical live scene, according to certain embodiments disclosed herein.

At block 230, the method 200 involves preparing a 360-degree scene using the extracted human body image of block 220 and the 360-degree virtual background image 101 of block 210, wherein preparing the 360-degree scene includes applying lighting effects to the human body image and to the virtual background based on a position of the human body image with respect to the identified light sources in the mapped graphical spherical object 102-2. For example, the extracted human body image is placed within the mapped graphical spherical object 102-2 as a human body object. The scene preparation subsystem 114 accesses the mapped graphical spherical object 102-2, for example, the mapped graphical spherical object 102-2 generated at block 210. As previously discussed in block 210, the mapped graphical spherical object 102-2 already has light sources identified (e.g. mapped) within the mapped graphical spherical object 102-2. The scene preparation subsystem 114 accesses the extracted human body image 103 generated at block 220. Also, the scene preparation subsystem 114 accesses camera events 124 data from the camera component 122. Camera events 124 data can include data related to a change in camera angle and a change in camera position. In certain embodiments, the scene preparation subsystem 114 prepares a finalized spherical live scene 105 based on the camera events 124 data, the extracted human body image 103, and the mapped graphical spherical object 102-2 that includes the identified light sources. In certain examples, the scene preparation subsystem 114 places and orients the human body object (the extracted human body image 103) within the mapped graphical spherical object 102-2 based on the camera events 124 data. For example, the scene preparation subsystem 114 places the extracted human body image 103 within the mapped graphical spherical object 102-2 based on the camera angle and position determined from the camera events 124 data. The scene preparation subsystem 114 determines lighting effects and shadow effects on the human body object (the extracted human body image 103 placed within the mapped graphical spherical object 102-2) and on the virtual background of the mapped graphical spherical object 102-2 based on the light sources identified in the mapped graphical spherical object 102-2 and applies these lighting effects and/or shadow effects to the human body object (the extracted human body image 103) within the mapped graphical spherical object 102-2 and to the virtual background region (the region not occupied by the human body object (the extracted human body image 103) of the mapped graphical spherical object 102-2 to generate the finalized spherical live scene 104. The scene preparation subsystem 114 determines the lighting effects and/or the shadow effects based on various properties of the light sources identified within the mapped graphical spherical object 102-2 including position, angle, color of light, brightness of light, intensity of light, and other properties. Applying the lighting effects and/or the shadow effects can include modifying one or more pixel values (e.g. red-green-blue color values, transparency values, etc.) of the pixels of the human body object (extracted human body image 103) portion of the mapped graphical spherical object 102-2 and/or one or more pixel values of the pixels of the virtual background region of the mapped graphical spherical object 102-2 to generate the finalized spherical live scene 104. FIG. 5 depicts an illustration of inserting the extracted human body image 103 of FIG. 4 in the mapped graphical spherical object 102-2 of FIG. 3 and applying lighting effects to the extracted human body image 103 and to the virtual background region based on light sources identified in the mapped graphical spherical object 102-2 to generate the finalized spherical live scene 104.

Figure 6:
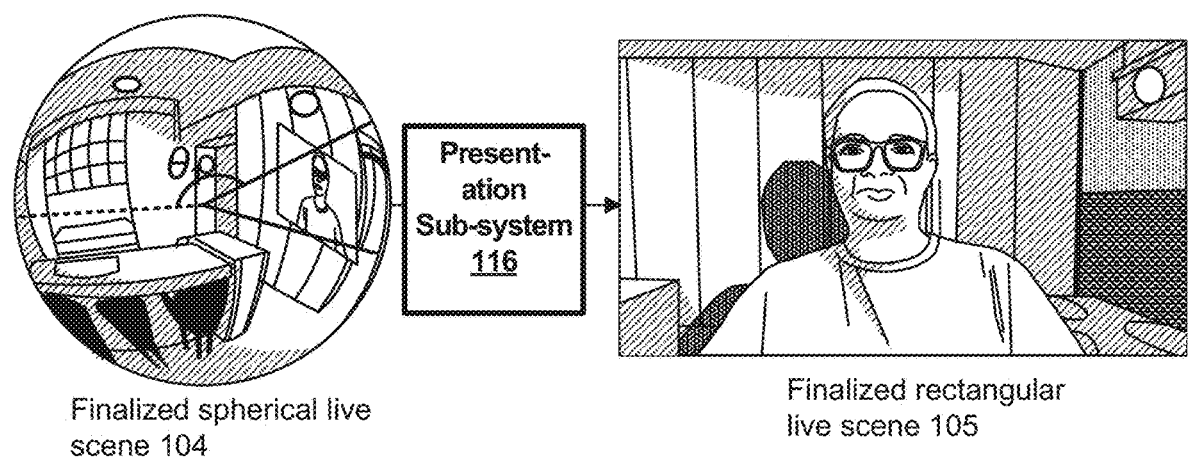
FIG. 6 depicts an illustration of conversion of a finalized spherical live scene of FIG. 5 to a finalized rectangular live scene, according to certain embodiments disclosed herein.

At block 240, the method 200 involves preparing a two-dimensional (2D) output image for the video call based on the 360-degree scene generated at block 230. In certain embodiments, the presentation subsystem 116 captures a finalized rectangular live scene 105 (the output image) using a virtual camera positioned within the finalized spherical live scene 104. The finalized rectangular live scene 105 is an image captured of the finalized spherical live scene 104 that includes the human body object (the extracted human body image 103) located within the mapped graphical spherical object 102-2 with lighting and/or shadow effects that were applied to the human body object and/or to the virtual background region of the mapped graphical spherical object 102-2. FIG. 6 depicts an illustration of conversion of a finalized spherical live scene 104 of FIG. 5 to a finalized rectangular live scene 105.

Figure 7:
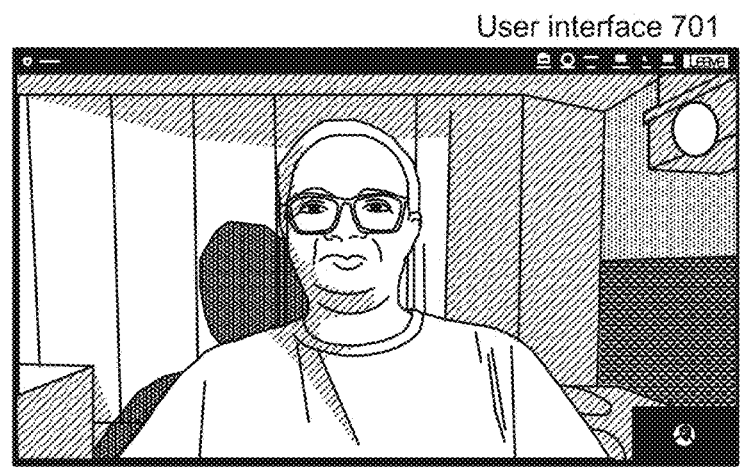
FIG. 7 depicts an illustration of a finalized rectangular live scene, according to certain embodiments disclosed herein.
Figure 8:
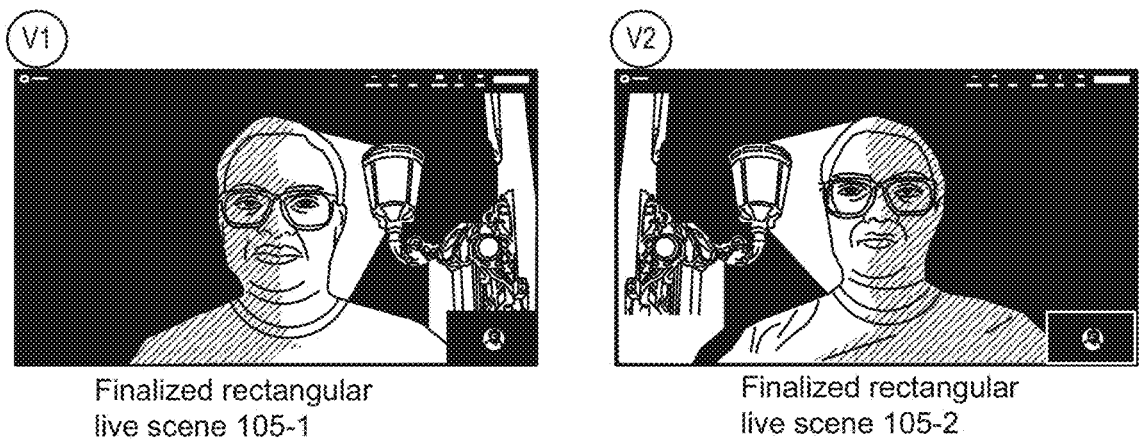
FIG. 8 depicts an illustration finalized rectangular live scenes including lighting effects on a virtual background and on a depiction of a video call participant at two positions in the virtual background with respect to a light source identified in the virtual background, according to certain embodiments disclosed herein.
Figure 9:
FIG. 9 depicts an illustration of a shadow effect applied to a depiction of a participant in a video call based on a light source identified in a virtual background, according to certain embodiments disclosed herein.
Figure 9:
Figure 10:
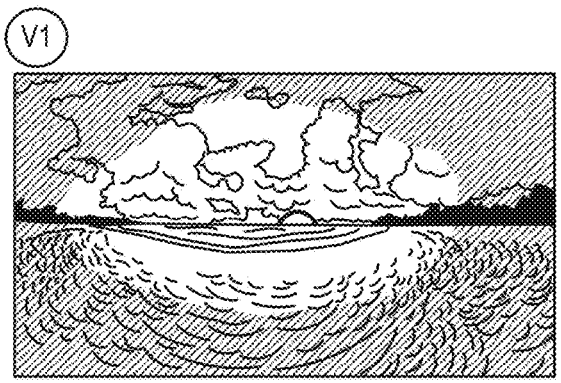
FIG. 10 depicts an illustration of lighting effects applied to a virtual background and to a depiction of a video call participant at various positions in the virtual background with respect to a light source of the virtual background that is outside of a view frame, according to certain embodiments disclosed herein.
Figure 10:
Figure 10:
Figure 10:

At block 250, the method 200 involves displaying, during the video call via a second user computing device different from the first user computing device, the 2D output image generated at block 240. For example, a first video call participant uses a first user computing device 120 to participate in a video call with a second video call participant who is using a second user computing device 140. is depicted within the 2D output image (the finalized rectangular live scene 105). In this example, the finalized rectangular live scene 105 depicting the first video call participant within a virtual background is displayed via the user interface 145 of a user computing device 140 associated with a second video call participant. In certain examples, the finalized rectangular live scene 105 depicting the first video call participant within a virtual background is also displayed via the user interface 125 of the user computing device 120 associated with the first video call participant. FIG. 7 depicts an illustration of a finalized rectangular live scene 105. FIG. 8 depicts an illustration finalized rectangular live scenes 105 including lighting effects on a virtual background and on a depiction of a video call participant at two positions in the virtual background with respect to a light source in the virtual background. FIG. 9 depicts an illustration of a shadow effect applied to a depiction of a participant in a video call based on a light source identified in a virtual background. FIG. 10 depicts an illustration of lighting effects applied to virtual background and to a depiction of a video call participant at various positions within the virtual background with respect to a light source of the virtual background that is outside of a view frame.

In certain embodiments described herein, the scene generation system 110 repeats the method 200 so that as the video call participant changes a position, a pose, or an orientation within an environment captured by the live feed 123 of the camera component 122, the scene generation system 120 updates the subsequent finalized rectangular live scene 105. For example, the user can move around, tilt his or her head, change facial expressions, turn around, or otherwise change a position, orientation, or pose within his or her environment and the updated position, orientation, or pose is shown in the finalized rectangular live scene 105, with lighting and/or shadow effects from identified light sources in the virtual background applied to the human body object (the extracted human body image 103), after the method 200 is performed a subsequent time. Also, as the user computing device 120 camera component 122 angle or position changes, the field of view captured in the live feed 123 of the camera component 122 also changes, and the scene generation system 120 generates a subsequent finalized rectangular live scene 105, with lighting and/or shadow effects from identified light sources in the virtual background applied to the human body object (the extracted human body image 103) and/or to the virtual background, reflecting this updated field of view.

FIG. 3 depicts an illustration of a conversion of a 360 degree background image 101 to a mapped graphical spherical object 102-2 including identifying light sources, according to certain embodiments disclosed herein. For illustrative purposes, the FIG. 3 is described with reference to certain examples depicted in the figures. Other implementations, however, are possible. FIG. 3 at step A depicts a 360-degree background image 101. For example, the scene generation system 110 can receive a request to initiate a video call from a user computing device 110 and a selection of the 360 degree background image 101 for use to generate a virtual background for the video call. The scene generation system 110 can access the 360 degree background image 101 from the data storage unit 111. As shown in step B, the scene generation system 110 (e.g. the image processing subsystem 118) converts the 360-degree background image 101 to a mapped graphical spherical object 102-2. For example, the image processing system 118 maps the 360-degree background image 101 to a hollow sphere model (e.g. OpenGL hollow sphere). As shown in step B, the scene generation system 110 (e.g. the image processing system 118) identifies at least a light source at a location within the mapped graphical spherical object 102-2. In the example depicted in FIG. 3, the image processing subsystem 118 identifies the sun in the sky which is shining light into a room depicted in the mapped graphical spherical object 102-2 as the light source. In some examples, multiple light sources can be identified in a mapped graphical spherical object 102-2. The image processing system 118 can add a light source object 301 (e.g. an OpenGL based light source object) at the identified location of the light source. In some instances, the light source object 301 has predefined light properties that can be used to determine lighting effects on a human body object (an extracted human body image 103 that is inserted into the mapped graphical spherical object 102-2) and lighting effects on a virtual background region of the mapped graphical spherical object 102-2 that is not occupied by the human body object. The lighting effects can include lighting effects and/or shadow effects. For example, lighting effects can be caused by light from the identified light source(s) contacting the human body object within the mapped graphical spherical object 102-2 and/or contacting the virtual background region of the mapped graphical spherical object 102-2. For example, shadow effects can be caused by the extracted human body image 103 (human body object) and/or other objects within the mapped graphical spherical object 102-2 blocking light from the identified light source(s). For example, the light source is replaced with a Sun light source object 301. However, in some examples, other light source objects 301 can be used, for example, a gas lamp object, a halogen lamp object, a fire object, a neon light object, an LED lamp object, a tungsten filament lamp object, or other light source object 301. The light source object 301 can be associated with one or more properties such as a color, an intensity, a directionality of emitted light (e.g. the light travels in all directions or travels in a specific direction), or other predefined properties of the light source object. In an example, the light source objects 301 are stored in the data storage unit 111 image processing system 118 applies one or more object detection algorithms to the mapped graphical spherical object 102-2 to identify the light source as well as the type (e.g. a Sun) of light source 301. In this example, the image processing system 118 retrieves the light source object from the data storage unit 111 is associated with the type (e.g. a sun, a lamp, etc.) associated with the light source detected in the mapped graphical spherical object 102-2. Further details about generating the mapped graphical spherical object 102-2, identifying light sources within the mapped graphical spherical object 102-2, and generating light source objects 301 for the mapped graphical spherical object 102-2 are described at block 210 of FIG. 2.

FIG. 4 depicts an illustration of an extraction of an extracted human body image from a live feed received from a camera component of a user computing device, according to certain embodiments disclosed herein. For illustrative purposes, the FIG. 4 is described with reference to certain examples depicted in the figures. Other implementations, however, are possible. FIG. 4 depicts a field of view of the live feed 123 of the camera component 122 of the user computing device 120. The live feed 123 is a live video feed including video of the user's body as well as any other objects in the environment captured by the camera component 122. FIG. 4 also depicts the extracted human body image 103 generated by the video processing subsystem 112 from the live feed 123. Further details about creating the extracted human body image 103 from the live feed 123 are described at block 220 of FIG. 2.

FIG. 5 depicts an illustration of inserting the extracted human body image 103 of FIG. 4 in the mapped graphical spherical object of FIG. 3 and applying lighting effects to the extracted human body image 103 (human body object) and to a virtual background region of the mapped graphical spherical object 102-2 based on light sources identified in the mapped graphical spherical object 102-2 to generate a finalized spherical live scene 104, according to certain embodiments disclosed herein. For illustrative purposes, the FIG. 5 is described with reference to certain examples depicted in the figures. Other implementations, however, are possible. For example, the virtual background region corresponds to a region of the mapped graphical spherical object 102-2 which is not occupied by the human body object (the extracted human body image 103). For example, the mapped graphical spherical object 102-2 with the light source object 301 as depicted in FIG. 3 is used as a virtual background into which the extracted human body image of FIG. 4 is inserted. As depicted in FIG. 5, a virtual camera position is indicated by the solid and dashed lines and camera angle indicated by theta. As depicted in FIG. 5, the extracted human body image 103 is projected onto a surface of the mapped graphical spherical object 102-2 and lighting effects and a shadow effect (e.g. a shadow shown on the wall) are applied to the extracted human body image 103 and/or to the virtual background region not occupied by the human body object (the extracted human body image 103) to generate the finalized spherical live scene 104. The camera position and camera angle indicated in FIG. 5 can be determined based on the camera events 124 data (e.g. changes in camera position, changes in camera angle, changes in magnification/zoom factor, etc.) received from the camera component 122 of the user computing device 120 and a mapping between the actual camera position and angle of the camera component 122 and a virtual camera within the finalized spherical live scene 104 can be determined. Further details about creating the finalized spherical live image 104 are described at block 230 of FIG. 2.

FIG. 6 depicts an illustration of conversion of a finalized spherical live scene 104 of FIG. 5 to a finalized rectangular live scene 105 by the presentation subsystem 116, according to certain embodiments disclosed herein. For illustrative purposes, the FIG. 6 is described with reference to certain examples depicted in the figures. Other implementations, however, are possible. In certain embodiments, the presentation subsystem 116 captures a finalized rectangular live scene 105 (the output image) using a virtual camera positioned within the finalized spherical live scene 104. The finalized rectangular live scene 105 is an image captured of that finalized spherical background image 104 that includes the human body object (the extracted human body image 103) located within the finalized spherical background image 104 with lighting and/or shadow effects that were applied to the human body object (the extracted human body image 103) and/or to the virtual background region in the finalized mapped graphical spherical object 102-2. As seen in the example depicted in FIG. 6, a position and direction of a shadow behind the user's head in the finalized rectangular live scene 104 corresponds to effects of the human body object (the human body image 103) on light emitted by light objects (at least the Sun light source object 301 of the mapped graphical spherical object 102-2) of the virtual background. Further details about generating the finalized rectangular live scene 105 from the finalized spherical live scene 104 are described at block 240 of FIG. 2.

FIG. 7 depicts an illustration of the example finalized rectangular live scene generated in FIG. 6, according to certain embodiments disclosed herein. For illustrative purposes, the FIG. 7 is described with reference to certain examples depicted in the figures. Other implementations, however, are possible. As shown in FIG. 7, the finalized rectangular live scene 105 is depicted within a user interface 701, for example, the user interface 125 of the user computing device 120 of the video call participant that is depicted within the virtual background and/or a user interface 145 of a user computing device 140 of another video call participant which whom the participant is conducting a video call. As depicted in FIG. 7, the user interface 701 includes the display of the finalized rectangular scene 105 as well as user interface objects for controlling the video call. For example, the user viewing the finalized rectangular scene 105 via the user interface 701 could interact with the user interface 701 to instruct the scene generation system 110 to disconnect the view of the finalized rectangular scene 105, change the view from the finalized rectangular scene 105 to view the live feed 123, and/or disconnect the video call. In this example, the scene generation system 110 disconnects the view of the finalized rectangular scene 105, changes the view from the finalized rectangular scene 105 to view the live feed 123, and/or disconnects the video call responsive to receiving the corresponding input via the user interface 701.

FIG. 8 depicts an illustration finalized rectangular live scenes including lighting effects on a virtual background and on a depiction of a video call participant at two positions in the virtual background with respect to a light source object in the virtual background, according to certain embodiments disclosed herein. For illustrative purposes, the FIG. 8 is described with reference to certain examples depicted in the figures. Other implementations, however, are possible. In the finalized rectangular live scenes 105-1 and 105-2 depicted in FIG. 8, the light source (lamp post) appears at different positions with respect to the video call participant's face and, accordingly, the lighting and shadow effects on the video call participant's face are different between the finalized rectangular live scene 105-1 and the finalized rectangular live scene 105-2. For example, the finalized rectangular live scene 105-1 and the finalized rectangular live scene 105-2 are both generated by projecting an extracted human body image 103 extracted from a live feed 122 into a mapped graphical spherical object 102-2 with a light source object (the lamp post light bulb). In the finalized rectangular live scene 105-1, the camera view of the video call participant is rotated at 180 degrees compared to his position/orientation. For example, between a first time associated with the finalized rectangular live scene 105-1 and a second time associated with the finalized rectangular live scene 105-2, the user rotated his body and his user computing device 120 (and its camera component 122 capturing the live feed 123 data) by 180 degrees. In the finalized rectangular live scene 105-1 the lamp post light source is on the right side of the user's face (from the perspective of the viewer) and light is shown reflecting off of the right side of the user's face from the lamp post light source. In the finalized rectangular live scene 105-1 the lamp post light source is on the left side of the user's face (from the perspective of the viewer) and light is shown reflecting off of the left side of the user's face from the lamp post light source.

FIG. 9 depicts an illustration of a shadow effect applied to a depiction of a participant in a video call based on a light source identified in a virtual background, according to certain embodiments disclosed herein. For illustrative purposes, the FIG. 9 is described with reference to certain examples depicted in the figures. Other implementations, however, are possible. FIG. 9 depicts a 360 degree background image 101 used to generate the finalized rectangular live scene 105 of FIG. 9. In the finalized rectangular live scene 105 a floor lamp light source is on the right side of the user's face (from the perspective of the viewer) and light is shown reflecting off of the right side of the user's face from the floor lamp light source as well as forming a shadow effect on a wall behind the user caused by an interaction of the light source with the depicted user.

FIG. 10 depicts an illustration of lighting effects applied to a virtual background and to a depiction of a video call participant at various positions in the virtual background with respect to a light source of the virtual background that is outside of a view frame, according to certain embodiments disclosed herein. For illustrative purposes, the FIG. 10 is described with reference to certain examples depicted in the figures. Other implementations, however, are possible.

In the finalized rectangular live scenes 105-1, 105-2, and 105-3 depicted in FIG. 10, which are generated for a virtual background based on the 360 degree background image 101 of a beach scene, the light source (the sun) of the virtual background appears in finalized rectangular live scene 105-1 but does not appear in finalized rectangular live scenes 105-2 and 105-3. The lighting and shadow effects on the video call participant's body and on the virtual background region of the respective scenes 105-1, 105-2, and 105-3 as a result of an interaction between light emitted from the light source and the depicted participant's body are different between the finalized rectangular live scenes 105-1, 105-2, and 105-3. The difference in lighting and shadow effects between live scenes 105-1, 105-2, and 105-3 are based on differences in the relative position of the user's extracted body image within the virtual background with respect to the light source in the virtual background. For example, the finalized rectangular live scenes 105-1, 105-2, and 105-3 are each generated by projecting an extracted human body image 103 extracted from a live feed 122 into a mapped graphical spherical object 102-2 with a light source object attached (the sun light source object). For example, the lighting effects on the user's face as well as shape and position of a shadow formed by user's body due to its position with respect to the virtual light source object are different between each of finalized rectangular live scenes 105-2 and 105-3, while the shadow does not appear in the finalized rectangular live scene 105-1. For example, the Sun light source cannot be seen directly in live scenes 105-2 and 105-3, but the effects of the Sun light source in live scene 105-2 and in live scene 105-3 can still be seen. For example, in live scene 105-2, a lighting effect on the left side of the depicted user's face and a shadow effect behind and to the right of the user's face is generated as a result of light from the light source (e.g. the Sun which is outside of the frame of view) interacting with the depicted user. For example, in live scene 105-3, a lighting effect on the right side of the depicted user's face and shadow effect to the left and to the right of the user's face as a result of light from the light source (e.g. the Sun which is outside of the frame of view) interacting with the depicted user.

Examples of Computing Environments for Implementing Certain Embodiments

Figure 11:
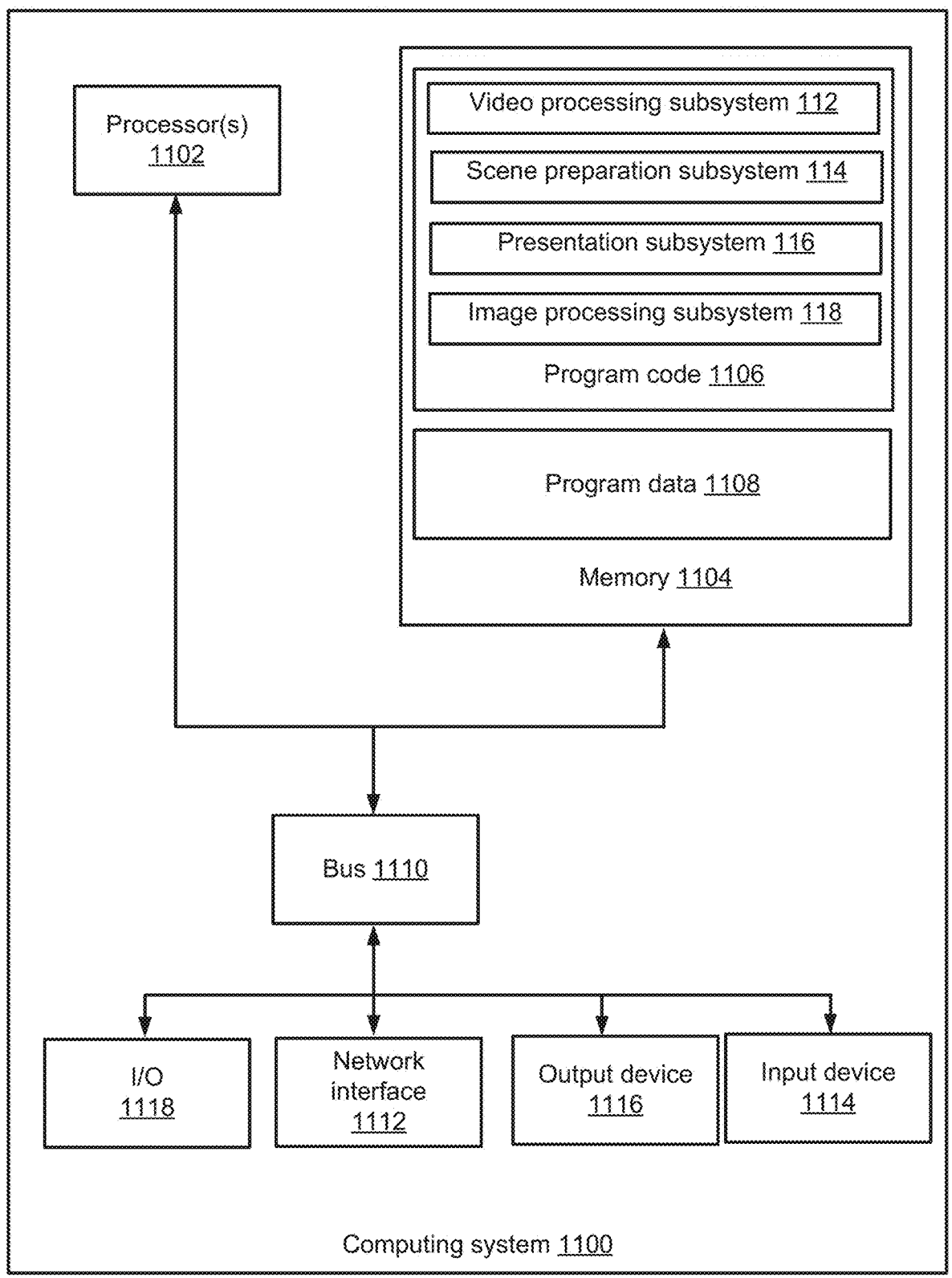
FIG. 11 depicts an example of a computing system that performs certain operations described herein, according to certain embodiments disclosed herein.

Any suitable computer system or group of computer systems can be used for performing the operations described herein. For example, FIG. 11 depicts an example of a computer system 1100. The depicted example of the computer system 1100 includes a processing device 1102 communicatively coupled to one or more memory components 1104. The processing device 1102 executes computer-executable program code stored in a memory component 1104, accesses information stored in the memory component 1104, or both. Execution of the computer-executable program code causes the processing device to perform the operations described herein. Examples of the processing device 1102 include a microprocessor, an application-specific integrated circuit ("ASIC"), a field-programmable gate array ("FPGA"), or any other suitable processing device. The processing device 1102 can include any number of processing devices, including a single processing device.

The memory components 1104 includes any suitable non-transitory computer-readable medium for storing program code 1106, program data 1108, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 504 can be volatile memory, non-volatile memory, or a combination thereof.

The computer system 1100 executes program code 1106 that configures the processing device 1102 to perform one or more of the operations described herein. Examples of the program code 1106 include, in various embodiments, the scene generation system 110 (including the video processing subsystem 112, the scene preparation subsystem 114, the presentation subsystem 116, and the image processing subsystem 118) of FIG. 1, which may include any other suitable systems or subsystems that perform one or more operations described herein (e.g., one or more neural networks, encoders, attention propagation subsystem and segmentation subsystem). The program code 1106 may be resident in the memory components 1104 or any suitable computer-readable medium and may be executed by the processing device 1102 or any other suitable processor.

The processing device 1102 is an integrated circuit device that can execute the program code 1106. The program code 1106 can be for executing an operating system, an application system or subsystem, or both. When executed by the processing device 1102, the instructions cause the processing device 1102 to perform operations of the program code 1106. When being executed by the processing device 1102, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 1104 store the program data 808 that includes one or more datasets described herein. In some embodiments, one or more of data sets are stored in the same memory component (e.g., one of the memory components 1104). In additional or alternative embodiments, one or more of the programs, data sets, models, and functions described herein are stored in different memory components 1104 accessible via a data network. One or more buses 1110 are also included in the computer system 1100. The buses 1110 communicatively couple one or more components of a respective one of the computer system 1100.

In some embodiments, the computer system 1100 also includes a network interface device 1112. The network interface device 1112 includes any device or group of devices suitable for establishing a wired or wireless data connection to one or more data networks. Non-limiting examples of the network interface device 1112 include an Ethernet network adapter, a modem, and/or the like. The computer system 1100 is able to communicate with one or more other computing devices via a data network using the network interface device 1112.

The computer system 1100 may also include a number of external or internal devices, an input device 1114, a presentation device 1116, or other input or output devices. For example, the computer system 1100 is shown with one or more input/output ("I/O") interfaces 1118. An I/O interface 1118 can receive input from input devices or provide output to output devices. An input device 1114 can include any device or group of devices suitable for receiving visual, auditory, or other suitable input that controls or affects the operations of the processing device 1102. Non-limiting examples of the input device 1114 include a touchscreen, a mouse, a keyboard, a microphone, a separate mobile computing device, etc. A presentation device 1116 can include any device or group of devices suitable for providing visual, auditory, or other suitable sensory output. Non-limiting examples of the presentation device 1116 include a touchscreen, a monitor, a speaker, a separate mobile computing device, etc.

Although FIG. 11 depicts the input device 1114 and the presentation device 1116 as being local to the computer system 1100, other implementations are possible. For instance, in some embodiments, one or more of the input device 1114 and the presentation device 1116 can include a remote client-computing device that communicates with computing system 1100 via the network interface device 1112 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 12:
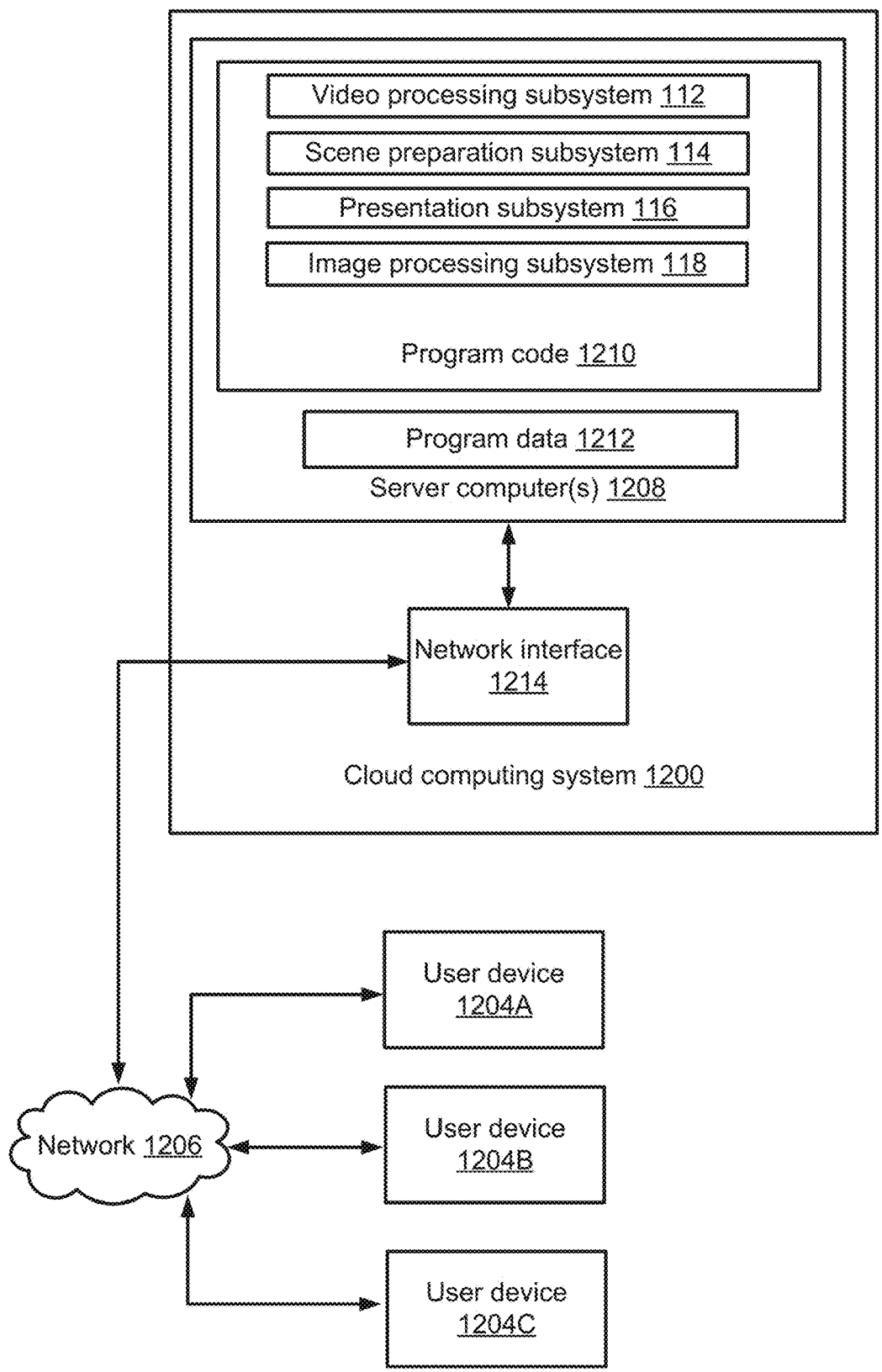
FIG. 12 depicts an example of a cloud computing system that performs certain operations described herein, according to certain embodiments disclosed herein.

In some embodiments, the functionality provided by computer system 1100 may be offered as cloud services by a cloud service provider. For example, FIG. 12 depicts an example of a cloud computer system 1200 offering a service for generating finalized rectangular live scenes 105 for a video call, which can be used by a number of user subscribers using user devices 1204A, 1204B, and 1204C across a data network 1206. The cloud computer system 1200 performs the processing to provide the service of generating the finalized rectangular live scenes 105. The cloud computer system 1200 may include one or more remote server computers 1208.

The remote server computers 1208 include any suitable non-transitory computer-readable medium for storing program code 1210 (e.g., the video processing subsystem 112, the scene preparation subsystem 114, the presentation subsystem 116, and the image processing subsystem 118 of FIG. 1) and program data 1212, or both, which is used by the cloud computer system 1100 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1208 can include volatile memory, non-volatile memory, or a combination thereof.

One or more of the server computers 1208 execute the program code 1210 that configures one or more processing devices of the server computers 1208 to perform one or more of the operations that generate finalized rectangular live scenes 105. As depicted in the embodiment in FIG. 12, the one or more servers providing the service for generating finalized rectangular live scenes 105 may implement the video processing subsystem 112, the scene preparation subsystem 114, the presentation subsystem 116, and the image processing subsystem 118. Any other suitable systems or subsystems that perform one or more operations described herein (e.g., one or more development systems for configuring an interactive user interface) can also be implemented by the cloud computer system 1200.

In certain embodiments, the cloud computer system 1200 may implement the services by executing program code and/or using program data 1212, which may be resident in a memory component of the server computers 1208 or any suitable computer-readable medium and may be executed by the processing devices of the server computers 1208 or any other suitable processing device.

In some embodiments, the program data 1212 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 1206.

The cloud computer system 1200 also includes a network interface device 1214 that enable communications to and from cloud computer system 1200. In certain embodiments, the network interface device 1214 includes any device or group of devices suitable for establishing a wired or wireless data connection to the data networks 1206. Non-limiting examples of the network interface device 1214 include an Ethernet network adapter, a modem, and/or the like. The service for generating finalized rectangular live scenes 105 is able to communicate with the user devices 1204A, 1204B, and 1204C via the data network 1206 using the network interface device 1214.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more computing devices associated with a scene generation system, the method including operations comprising:
    applying light source detection model to a mapped graphical spherical object to identify a light source region defining a light source within the mapped graphical spherical object, the mapped graphical spherical object comprising a three hundred sixty (360) degree virtual background mapped to a graphical spherical object;
    replacing, in the mapped graphical spherical object, the light source region with a light source object, the light source object comprising one or more light properties to generate a light source mapped graphical spherical object;
    extracting, during a video call between a first user computing device and a second user computing device, a human body object from a live video feed captured via the first user computing device;
    generating, based on the light source mapped graphical spherical object and the human body object, a finalized spherical image, wherein generating the finalized spherical image comprises:
        placing the human body object within the light source mapped graphical spherical object;
        applying one or more lighting effects to a region of the light source mapped graphical spherical object and to the human body object, wherein the lighting effects are caused by the light source object within the light source mapped graphical spherical object;
        generating the finalized spherical image by projecting the placed human body object onto a surface of the light source mapped graphical spherical object; and
    generating, from the finalized spherical image, a finalized rectangular live image.

2. The method of claim 1, further comprising:
    receiving, during the video call via an input to a first user interface of the first user computing device, a selection of the 360 degree virtual background from a set of 360 degree virtual backgrounds.

3. The method of claim 1, the operations further comprising transmitting, during the video call and to and for display on one or more of the first user computing device or the second user computing device, the finalized rectangular live image.

4. The method of claim 1, wherein the graphical spherical object comprises a hollow sphere model and wherein the operations further comprise generating, from the 360 degree virtual background, the mapped graphical spherical object by mapping the 360 degree virtual background to an inner surface of the hollow sphere model.

5. The method of claim 1, wherein placing the human body object within the light source mapped graphical spherical object comprises placing the human body object at an angle corresponding to a camera angle of the live video feed.

6. The method of claim 1, wherein the one or more light properties include one or more of an intensity of light emitted from the light source object, a color of the light emitted from the light source object, and a directionality of the light emitted from the light source object.

7. The method of claim 1, wherein the one or more lighting effects include a reflection of light or an absorption of light by one or more of a region of the light source mapped graphical spherical object capturing the human body object and another region of the light source mapped graphical spherical object outside of the region.

8. The method of claim 1, wherein applying the one or more lighting effects include applying a shadow effect to one or more of the human body object or a first region of the light source mapped graphical spherical object capturing the human body object and another a second region of the light source mapped graphical spherical object outside of the first region.

9. The method of claim 8, wherein the shadow effect represents a shadow effect on the first region or on the second region, wherein the shadow effect is caused by an interaction of the light emitted from the light source object of the light source mapped graphical spherical object with the human body object.

10. The method of claim 1, wherein generating the finalized rectangular live image comprises capturing the finalized rectangular live image from the finalized spherical image using a virtual camera, wherein the captured finalized rectangular live image does not depict the light source object.

11. A system comprising:
    a memory component; and
    a processing device coupled to the memory component, the processing device to perform operations comprising:
        applying a light source detection model to a mapped graphical spherical object comprising a three hundred sixty (360) degree virtual background image mapped to a graphical spherical object to identify a light source region defining a light source within the mapped graphical spherical object;
        generating a light source mapped graphical spherical object by replacing, in the mapped graphical spherical object, the light source region with a light source object associated with one or more light properties;
        generating, based on the light source mapped graphical spherical object and a human body object extracted from a live video feed captured via a first user computing device during a video call between the first user computing device and a second user computing device, a finalized spherical image,
        wherein the finalized spherical image comprises the human body object placed within the mapped graphical spherical object, wherein the finalized spherical image comprises one or more lighting effects applied to a region of the light source mapped graphical spherical object and to the human body object, wherein the one or more lighting effects are caused by the light source object within the light source mapped graphical spherical object; and generating, from the finalized spherical image, a finalized rectangular live image.

12. The system of claim 11, wherein the one or more lighting effects comprise one or more of lighting effects or shadow effects and wherein the region comprises a region of the human body object captured in the light source mapped graphical spherical object.

13. The system of claim 11, wherein the one or more lighting effects comprise one or more of lighting effects or shadow effects and wherein the region comprises a background region of the light source mapped graphical spherical image, wherein the background region is outside of a region of the human body object captured in the light source mapped graphical spherical image object.

14. The system of claim 11, wherein generating the finalized rectangular image comprises capturing the finalized rectangular live image using a virtual camera from the finalized spherical image, wherein the captured finalized rectangular live image does not depict the light source object.

15. The system of claim 11, the operations further comprising transmitting, during the video call and to and for display on one or more of the first user computing device or the second user computing device, the finalized rectangular live image.

16. The system of claim 11, wherein the graphical spherical object comprising a hollow sphere model, the operations further comprising:

receiving, during the video call, a selection of a 360 degree virtual background; and generating, responsive to the selection of the 360 degree virtual background, the mapped graphical spherical object by mapping the 360 degree virtual background to an inner surface of the hollow sphere model.

17. The system of claim 11, wherein the one or more lighting effects comprise a reflection of light or an absorption of light by one or more of a region of the light source mapped graphical spherical object depicting the human body object and another region of the light source mapped graphical spherical object outside of the region.

18. The system of claim 11, wherein the one or more lighting effects include applying one or more shadow effects, wherein the region comprises one or more of a region of the light source mapped graphical spherical object depicting the human body object and another region of the light source mapped graphical spherical object outside of the region, wherein the one or more shadow effects result from an interaction of the human body object with light emitted from the identified light source of the light source mapped graphical spherical object.

19. A non-transitory computer-readable medium storing executable instructions, which when executed by a processing device, cause the processing device to perform operations comprising:

generating a light source mapped graphical spherical object by applying an light source detection model to a mapped graphical spherical object associated with a three hundred sixty (360) degree virtual background to identify a light source region defining a light source within the mapped graphical spherical object, the mapped graphical spherical object comprising the 360 degree virtual background mapped to a graphical spherical object, wherein generating the light source mapped graphical spherical object comprises replacing, in the mapped graphical spherical object, the light source region with a light source object associated with one or more light properties;

generating, based on the light source mapped graphical spherical object and a human body object extracted from a live video feed captured via a first user computing device during a video call between the first user computing device and a second user computing device, a finalized spherical image, wherein generating the finalized spherical image comprises:

placing the human body object within the light source mapped graphical spherical object;

applying one or more of lighting effects or shadow effects to a region of the light source mapped graphical spherical object and to the human body object, wherein the one or more of lighting effects or shadow effects are caused by an interaction of light emitted from the light source mapped graphical spherical object with the placed human body object; and generating the finalized spherical image of the light source mapped graphical spherical object including the human body object by projecting the placed human body object onto a surface of the light source mapped graphical spherical object; and generating, from the finalized spherical image, a finalized rectangular live image.

20. The non-transitory computer-readable medium storing executable instructions of claim 19, wherein the operations further comprise:

receiving, during the video call via an input to a first user interface of the first user computing device, a selection of the 360 degree virtual background from a set of 360 degree virtual backgrounds.

* * * * *